United States Patent [19]

Rauch

[11] Patent Number: 4,524,285

[45] Date of Patent: Jun. 18, 1985

[54] HYDRO-CURRENT ENERGY CONVERTER

[76] Inventor: Hans G. Rauch, 426 Wayman Cir., West Palm Beach, Fla. 33406

[21] Appl. No.: 577,201

[22] Filed: Feb. 6, 1984

Related U.S. Application Data

[63] Continuation-in-part of Ser. No. 75,429, Sep. 14, 1979, abandoned.

[51] Int. Cl.$^3$ ............................................. F03B 13/10
[52] U.S. Cl. ..................................... 290/43; 290/54; 416/85
[58] Field of Search .......................... 290/43, 52, 54; 415/126; 416/85, 90 R, 91, 93 R, 244 R, 244 A, DIG. 4, DIG. 6; 417/334

[56] References Cited

U.S. PATENT DOCUMENTS

| | | | |
|---|---|---|---|
| 1,198,410 | 9/1916 | Bjornson | 416/DIG. 6 |
| 3,339,078 | 8/1967 | Crompton | 290/54 X |
| 4,001,596 | 1/1977 | Kurtzbein | 416/85 X |
| 4,095,918 | 6/1978 | Mouton, Jr. et al. | 290/54 X |
| 4,117,676 | 10/1978 | Atencio | 290/52 X |
| 4,163,904 | 8/1979 | Skendrovic | 290/54 |
| 4,306,157 | 12/1981 | Wracsaricht | 416/DIG. 4 |

FOREIGN PATENT DOCUMENTS

| | | | |
|---|---|---|---|
| 8100595 | 3/1981 | European Pat. Off. | 290/54 |
| 55-72665 | 5/1980 | Japan | 290/54 |

*Primary Examiner*—William M. Shoop
*Assistant Examiner*—W. E. Duncanson, Jr.
*Attorney, Agent, or Firm*—Eugene F. Malin

[57] ABSTRACT

A hydro-dynamic device for capturing the energy of a natural stream of flowing water, and converting such current or flow of water energy into electric power for user consumption. The device has a primary tubular housing, a sealed, conical, secondary housing mounted within the tubular housing, the secondary housing containing an electrical generator. The secondary housing has a conical end portion, and is disposed within and along the exterior housing longitudinally. A rotor which drives the generator is coupled to the secondary housing, having blades disposed within the path of water entering the primary housing. The interior housing is rigidly mounted to the exterior housing by support panels that also act as guide vanes for the flow of water through the exterior housing over the conical portion of the interior housing, thus increasing water flow velocity. Rigidly affixed toward the rear of said cone are further guide vanes, at an angle approaching forty-five degrees. The rotor has rigidly affixed vanes disposed at approximately forty-five degrees to the rotor. Thus, the flow of water entering the forward portion of the exterior housing is caused to flow over the conical inside housing, and is directed to the vanes affixed towards the rear of the conical inside housing, striking the rotor at an angle of approximately ninety degrees for maximum efficiency, thus turning the rotor and driving the generator. A tertiary housing is mounted inside the exterior housing along the longitudinal axis and at the exit of the exterior housing downstream of the rotor. The end faces of the outer housing include concentric, circular guard panels which are used to prevent entry of foreign objects into the primary housing. Located within the conical housing is another turbine rotor and gearing to ensure that the motor turns at its optimal frequency, regardless of rotor frequency, and fluid that can serve both as lubricant and coolant for the machinery within the secondary housing. The system can be mounted on a platform resting on a sea/river bed, or floated at preselected depths by a floatation system.

9 Claims, 9 Drawing Figures

HYDRO-CURRENT ENERGY CONVERTER

This is a continuation-in-part of application Ser. No. 075,429 filed Sept. 14, 1979, now abandoned.

BACKGROUND OF THE INVENTION

This invention relates generally to hydro-dynamic motors, and specifically to a motor which is useful for generating electricity by capturing naturally available energy from a flowing stream of water, such as the Gulfstream found along the coastal areas of the Eastern United States; rivers such as the Mississippi, canals, etc., wherein a flowing stream is created by ocean tides or other flowing streams created by man and transferred therefrom the appropriate lines to shore installations or floating installations for ultimate consumer use. Because of the energy which is created by the flow of water, as enumerated above, its capture and conversion into electrical energy for consumer use is without the need for the use of other fuels, such as fossilized fuels. Mother nature herself, or in some cases, man, has created an untapped, constantly available source of energy. The economic strangehold placed upon the United States by the OPEC nations by our reliance on fossilized fuels can be greatly reduced by the reduction of so-called "Power and Light Companies[']" need for burning off OPEC fuels. The hue and cry against nuclear power plants can be stilled in great part by their replacement with this device, individually or in strings, planted on our ocean or river beds or in proximity thereof, where that energy now being lost daily can be converted into electrical energy. All of this can be done without pollution or further reliance on OPEC for our daily needs, as we have become obligated to do. Day in and day out, the Gulfstream moves along our Southern coast. Day in and day out energy of water flow lost, which could be readily converted into useable electrical energy. The same loss applies to all of our great flowing rivers and tidal canals. While our country experiments with windmills, solar energy, etc., the daily loss of water current energy goes on. While many have talked about capturing the energy of the Gulfstream, no one has come forward with a simple, pollution-free manner of doing so until this device has been presented. For example: the Gulfstream moves at approximately four miles per hour. Current therefrom channelled into this device as it travels over the cone is accelerated to some six miles per hour, striking the fixed vanes on the back area of the cone and then deflected some ninety degrees against the vanes on the rotor which is mobile, and which turns the generator enclosed inside the cone, generating the electrical power, which is then transmitted to a shore installation for distribution or otherwise transmitted via floating platform or other similar device to shore installation for ultimate consumer use.

Accordingly, it is an object of this invention to provide a hydro-dynamic device which will capture the naturally occurring energy in a flowing stream of water and convert such into electrical energy for user consumption.

It is another object of this invention to provide a hydro-dynamic motor of improved efficiency which has an internal chamber for accelerating the water flow prior to its reaching the internal rotor blade.

And yet still another object of this invention is to provide a source of energy for providing electricity which does not disturb ecology, which does not use up fossil fuels or create air pollution or nuclear danger.

SUMMARY OF THE INVENTION

To secure these and other objects that shall become apparent hereinafter, there is provided a hydrodynamic motor comprising a rigid, tubular primary housing which may be anchored or permanently mounted so that it does not move relative to the ocean bed or bottom. The tubular housing is elongated and is disposed so that its longitudinal axis is substantially along the line of direction of the moving stream of water.

The front and rear entrances of the housing include circular panels appropriately supported by radial members which act to guard or shield the interior of the housing from receiving any articles from the surrounding water that might damage the rotor or internal structure of the motor. The circular panels also act as guides for the flow of the water into the entrance and out the exit of the exterior housing.

Within the exterior housing is mounted a second housing which contains an electrical generator. The second housing is mounted centrally along the longitudinal axis of the first housing on flat, radially disposed panels connected between the inside of the exterior housing to the secondary housing. The support panels are connected along segments of the interior housing and also act as guides for the water flowing into the primary housing. The front face (upstream) of the secondary housing is an elongated cone with the apex and axis of the cone being coaxial with the longitudinal axis of the exterior housing. The base diameter of the cone is approximately the diameter of the circular housing containing the generator and is unitarily formed therewith, making the generator housing a sealed unit as is described in greater detail below. The conical shape of the secondary housing in conjunction with the inner surface of the primary housing acts to increase the flow of water within the primary housing, causing the increased velocity of the water due to the reduction of the effective cross-sectional flow through area of the general housing.

Immediately downstream of the secondary housing is a rotor having a plurality of angularly disposed blades relative to a plane through the rotor. These blades are effectively sized so that the blades radially traverse the interior area from the surface of the interior housing to the perimeter of the internal diameter of the primary housing such that water flowing into the primary housing (initially caused by the current of the stream) is accelerated by the conical shape of the secondary housing, prior to striking the rotor blades much as water waves approaching a shoreline accelerate as the waves travel along the increasingly shallow (i.e. upwardly sloping) sea bed. The circular rotor housing is mounted centrally on a shaft, the shaft being connected to the generator within the secondary housing and appropriately sealed to prevent water from being received into the secondary housing. A third or tertiary housing mounted on the other side of the rotor and supported on the inside of the housing is utilized to support the rotor shaft and to aid in reducing eddy currents or cavitation for enhancing efficiency after the water flow has passed the rotor blades. Additional guide vanes may be utilized downstream of the rotor blades which also support the tertiary housing.

Fixed to the secondary housing just prior to the rotor are static guide vanes which are angled relative to a diametral plane along the longitudinal axis of the exterior housing to cause a deflection of the water flow so that it may strike the angled rotor blades at the maximum reactive force angle. Thus, the static guide vanes, which may be, for example, at an approximate forty-five degree angle in conjunction with the rotor blades which are also at the exemplery reciprocal forty-five degree angle, in effect cause the water flowing past the guide vanes to strike the rotor blades at approximately a ninety degree angle. Thus, maximum force is applied to the rotor blade.

To recover the electrical energy from the generator, appropriate electrical cables or conduits are connected between the generator and the inside of the secondary housing to some remote exterior location outside of the motor itself. This could be deployed to some location on shore which receives and transmits the enegy to the users.

The instant invention will be more fully understood from the following detailed description, it being understood, however, that the invention is capable of extended application, and is not confined to the precise disclosure. Changes and modifications may be made that do not affect the spirit of the invention, nor exceed the scope thereof, as expressed in the appended claims. Accordingly, the instant invention will now be described with particular reference to the accompanying drawings.

DETAILED DESCRIPTION OF THE INVENTION

Figure 1:
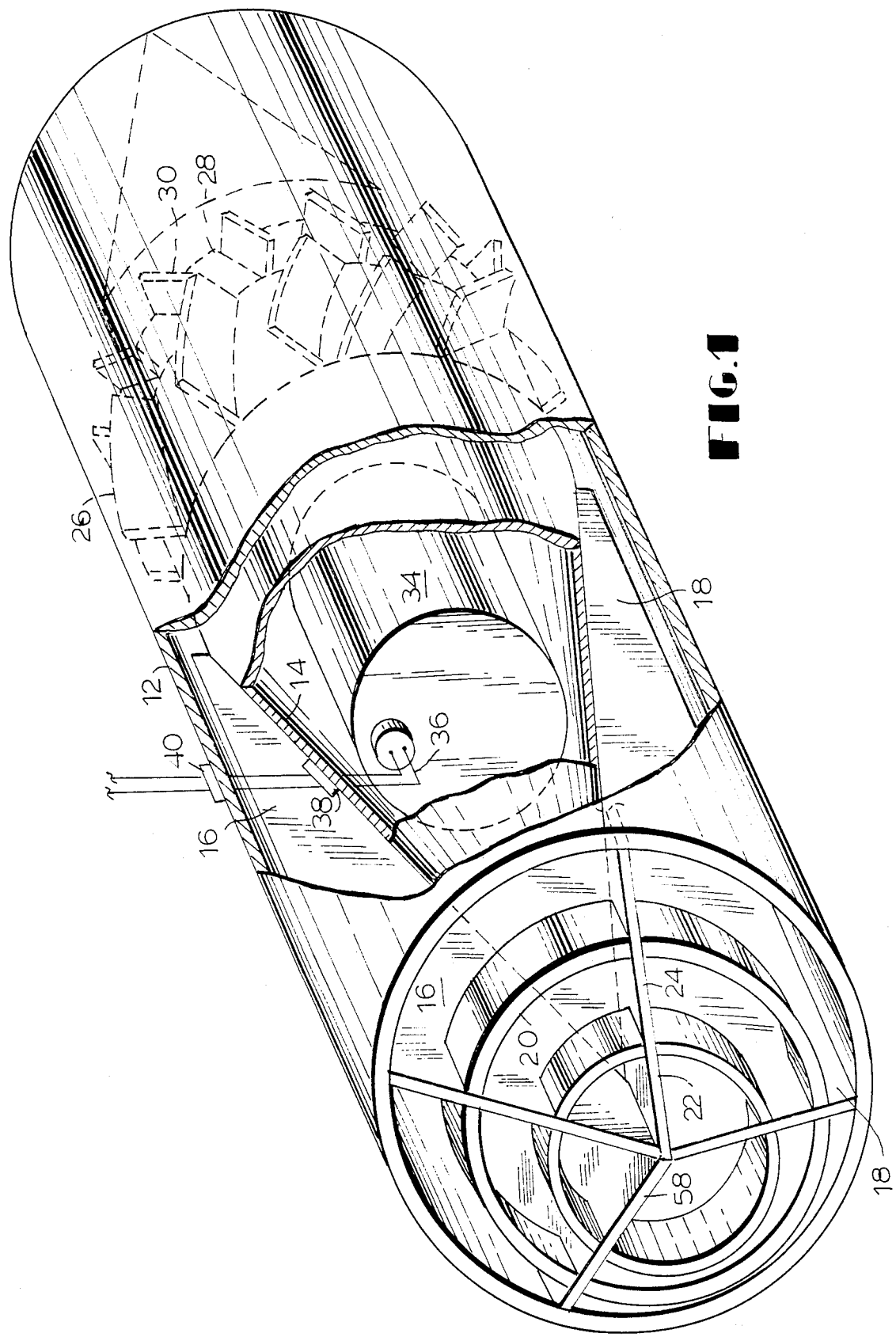
FIG. 1 shows a perspective view partially cut away of one embodiment of the present invention.
Figure 2:
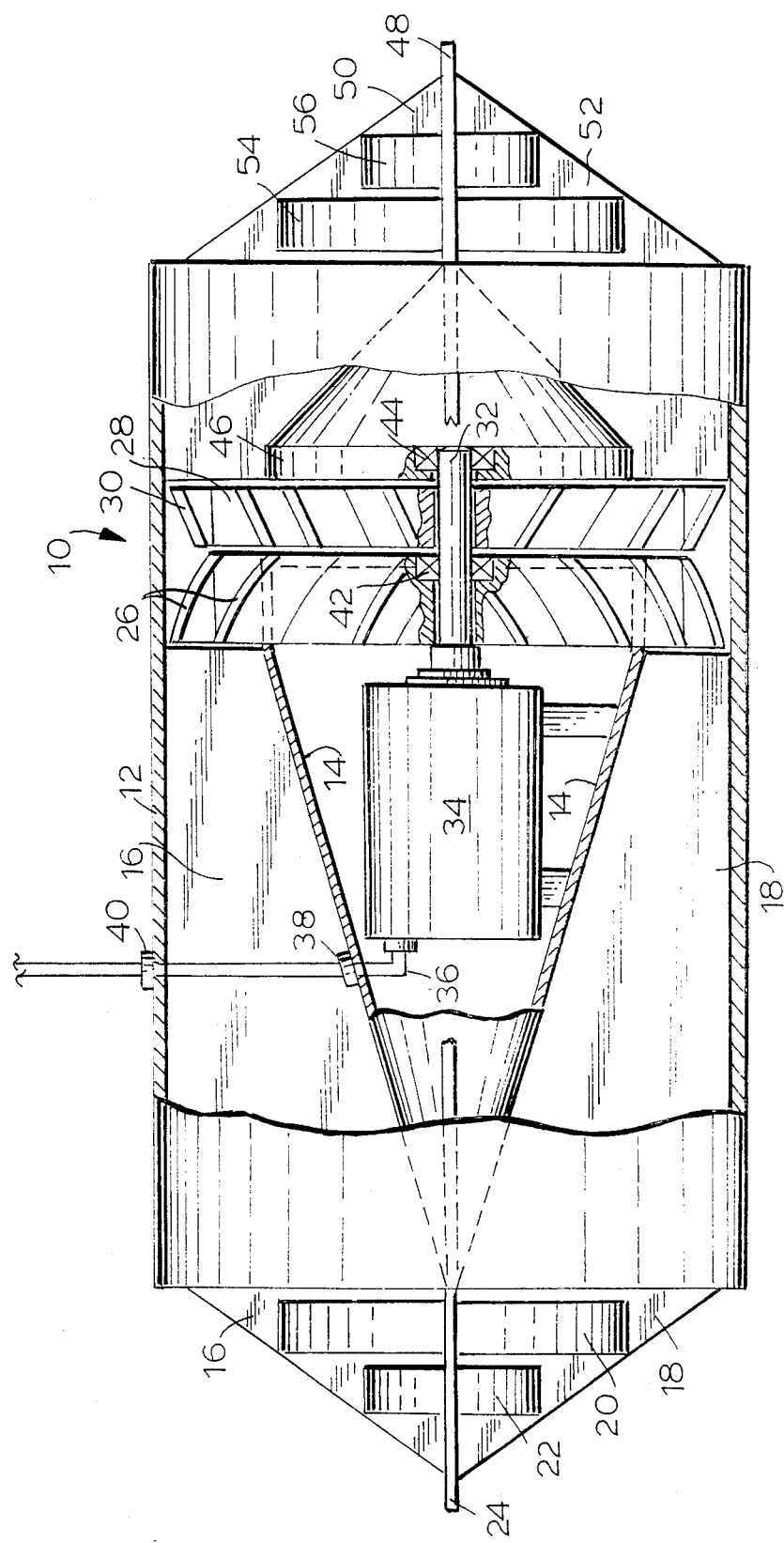
FIG. 2 shows a side elevational view partially in cross-section of the present invention.

Referring now to the drawings, and specifically FIGS. 1 and 2, the present invention is shown generally at 10 comprised of a primary, rigid, tubular housing 12 that may be constructed of any substantial material that is not corroded by sea water or fresh water, such as stainless steel or the like. A secondary housing 14 is mounted within the tubular primary housing 12 on four panels 16, 18, 24, and 58 which are rigid, flat panels disposed substantially to form quadrants radially and are fixed to the secondary housing 14 supporting it centrally along the longitudinal axis of the primary housing.

The secondary housing 14, which has a conical front face, contains an electrical generator 34 having externally leading electrical lines 36 disposed through seals 38 and 40 ultimately terminating at a remote location on a floating station or other transmission means to receive electrical energy from generator 34 for consumption. The downstream end of housing 14 includes a sealed support shaft bearing 42 which allows shaft 32 connected to the generator and to a rotor 28 to be sealed.

A teritary housing 46, which is also conically shaped in an opposite direction to that of housing 14, includes a sealed bearing 44 at the terminal end of shaft 32, allowing the shaft to rotate properly without allowing water into the tertiary housing. The tertiary housing is also supported by four rigid planar panels 48, 50, 52, and an opposite panel not shown, such that the panels form quadrants, allowing the support panels to also act as water flow guide vanes for water leaving the rotor 28.

The upstream end, which is shown in FIG. 2, is the left end of the primary housing 12, includes circular panels 20 and 22 somewhat concentrally disposed (see FIG. 3) which act as a guard to prevent any type of harmful objects which would damage the static or rotor blades or the internal secondary housing from being received within the primary housing 12. The circular panels 20 and 22 also act to guide the flow of water into the external housing.

A plurality of static guide vanes 26 are firmly affixed to the downstream peripheral end of housing 14 to cause deflection of water flowing longitudinally into the primary housing 12 for a more efficient contact with the rotor blade 30 fixed to rotor housing 28 which is keyed into shaft 32 such that as the rotor 30 turns due to the flowing water, the rotor housing 28 which is keyed (not shown) to shaft 32 causes the generator shaft 32 to rotate the generator mechanism, generating electricity.

Note that the rotor blades form an angle with the statis guide vanes of approximately ninety degrees to provide the maximum reactive force on the rotor. The angle is adjusted slightly to compensate for the relative motion of the rotor blades relative to the static blades to maximize the reactive force of the flowing water on the rotor blade. The angles of static guide vanes—and rotor blades—are also such that the flow incident on each results in torques on each that are oppositely directed. Were this not so, energy converter 10 would tend to rotate about its longitudinal axis.

Rotor housing 28 can be constructed with internal hollow air filled spaces (not shown). Besides reducing the rotor's inertia and saving on material cost, such spaces provide positive buoyancy to lessen friction between shaft 32 and bearings 42, 44.

The conical secondary housing 14, which has the apex of its conical shape disposed in an upstream direction, in conjunction with the interior surface of the primary housing 12, act to accelerate the water received in the upstream end of the primary housing 12 as it travels through primary housing 12. This enhances the energy output of the motor.

The conical shape of the tertiary housing 46 in conjunction with the support guide panels 48, 50, 52, and the panel (not shown) on the opposite side and with circular guard panels 54 and 56 also enhance the flow pattern past the rotor blades to reduce turbulence, eddy currents, or any type of cavitation for increased efficiency.

The entire motor, as shown in FIGS. 1 and 2, could be permanently mounted with a rigid frame or platform and placed on an ocean, lake, or river bottom, or could be anchored by appropriate lines at a preferred depth to maximize or take advantage of particular current occurring in nature.

Figure 9:
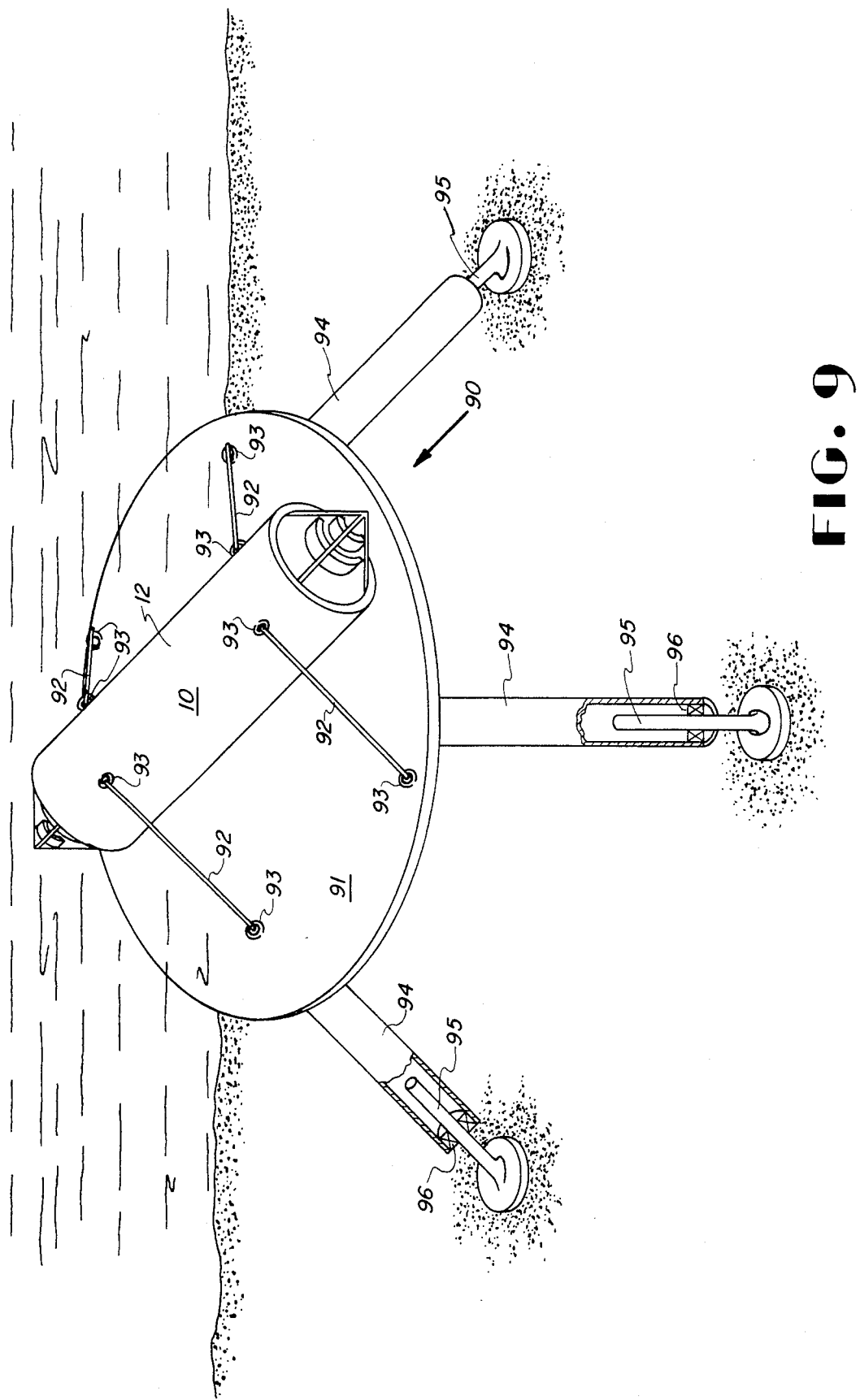
FIG. 9 is a perspective view of a tripod, on which the invention could be mounted for permanent, installation on the sea floor.

For example, if currents are particularly favorable near the river or sea bottom, one can permanently mount energy converter 10 on an appropriate support structure resting on the bottom. Such a support structure is illustrated in FIG. 9, which shows tripod 90 holding energy converter 10. Converter 10 can be fixed to surface 91 of tripod 90 by lines 92, which could be cables attached to eyelets 93. Alternatively, one could bolt or weld converter 10 directly to surface 91, or otherwise attach 10 to 91 by any appropriate means. Legs 94 of tripod 90 may be of adjutable length to accomodate variations in the river/sea bed's contour. In the illustrated embodiment, legs 94 have telescoped within them members 95, which are sealed to legs 94 by bearing seal 96. Telescoped members 94, 95 can be hydraulically operated to individually adjust the length of each tripod leg.

Figure 7:
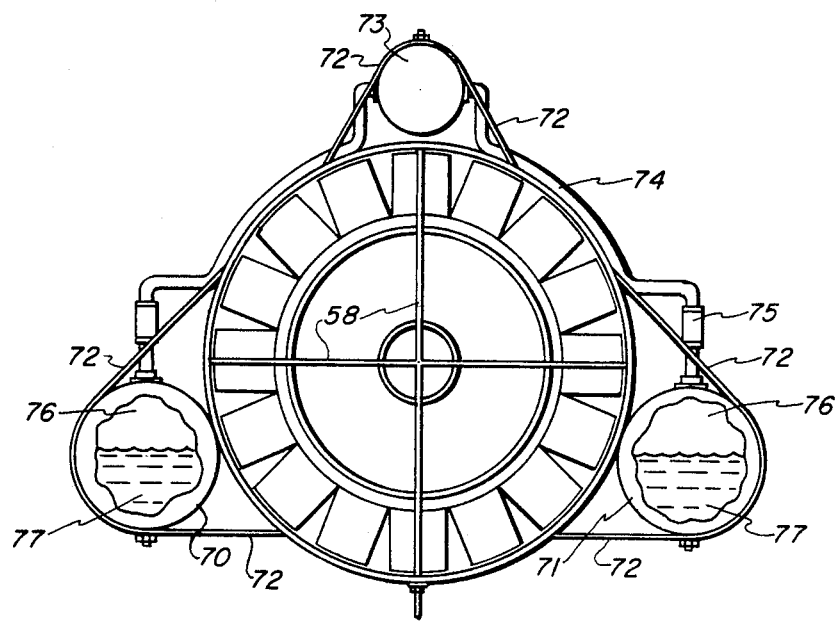
FIG. 7 is a rearward perspective view of the invention with a ballast system. The direction of the view is towards the rear entrance (upstream end) of the invention.
Figure 8:
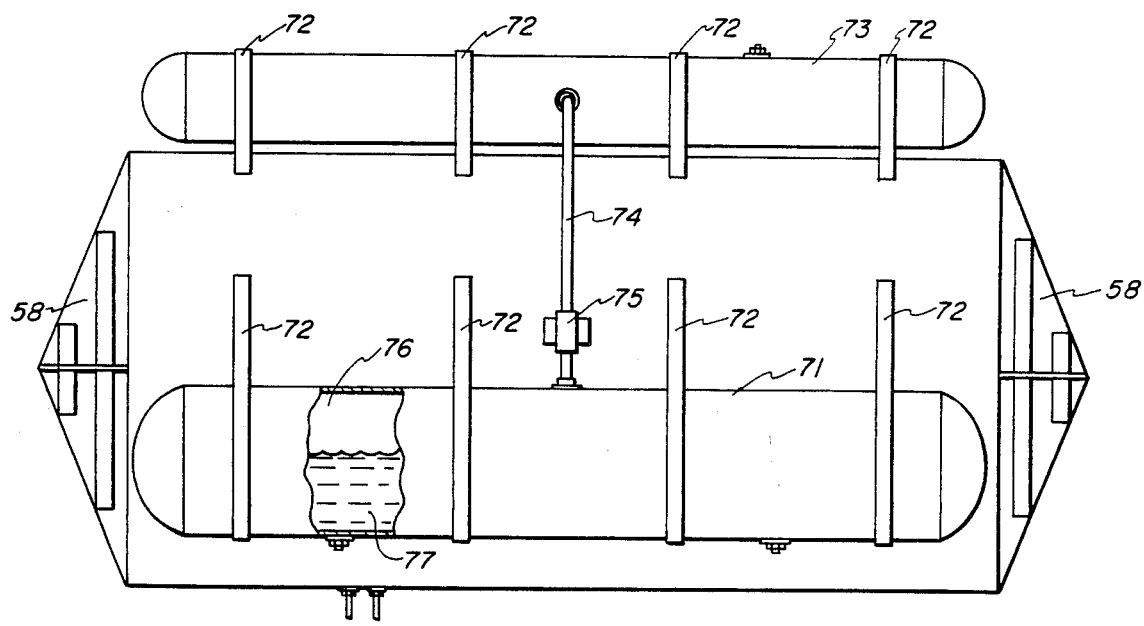
FIG. 8 is a side perspective view of the invention with the ballast system.

If it is impractical, or undesirable, to mount energy converter 10 to the bottom, one can suspend converter 10 at desired depths by use of the floatation system illustrated in FIGS. 7 and 8. The floatation system has floatation tanks 70, 71 attached by straps 72 to housing 12 of converter 10, and compressed air storage tank 73. Tanks 70, 71 are partially air filled (76) and partially water filled (77), to produce correct ballast. Connecting the interior of compressed air tank 73 to floatation tanks 72 is air line 74 having air valve 75. To decrease the ballast of converter 10, valve 75 is opened, and compressed air in tank 73 allowed to enter either of tanks 71, as appropriate, causing water in tanks 71 to be ejected (e.g. via check valves, or remotely controlled valves whose operation is keyed to operation of air valve 75). Ballast can be increased by bleeding off air in tanks 71 by any appropriate means. Valve 75 may be remote controlled, or automatically controlled responsive to the buoyancy or list of converter 10. A series of the motors as shown may be deployed side by side at spaced apart intervals along such a stream.

As shown, the generator is encapsulated in the secondary housing and is sealed from the exterior water so that the interior of the secondary housing does not receive any harmful water from the surrounding environment. The secondary housing can also be firmly conducted so as to dissipate heat generated by generator 34 through the heat exchange relationship of the water flowing through the primary housing.

Figure 3:
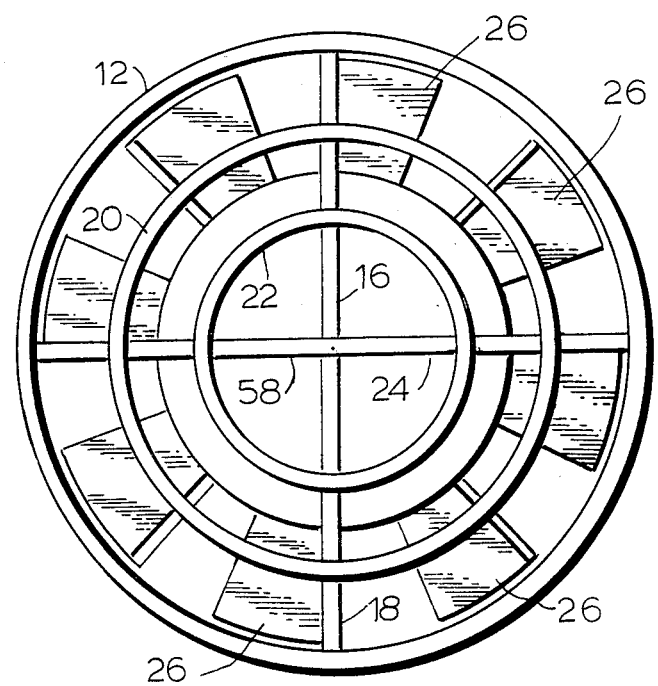
FIG. 3 shows a front end elevational view of the present invention looking down towards the inflow of the water into the device.

FIG. 3 shows an end view looking from the upstream end of the device showing the circular guard panels 20 and 22 which are attached to the support guide panels 16, 18, 24, and 58. The static guide vanes 26 disposed around the peripheral end of interior housing 14.

Figure 4:
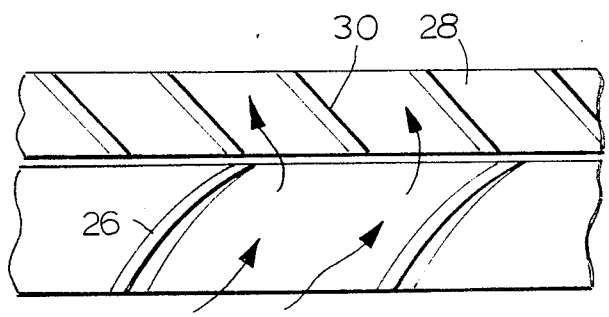
FIG. 4 shows a fragmentary top plan view of a portion of the rotor and static deflecting blades as used in the present invention.
Figure 5:
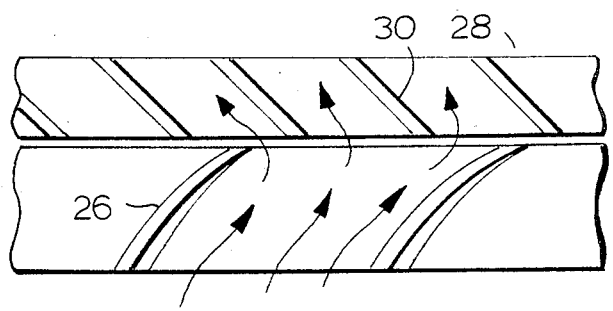
FIG. 5 shows the view of FIG. 4 with the rotor advanced relative to the static deflecting blades.

Looking at FIGS. 4 and 5, one embodiment of the relationship of the rotor blades is shown compared with the static guide vanes 26. Note that the rotor blades 30 are spaced such that two adjacent sets of rotor blades have the same spacial distance circumferentially around the rotor as two static guide vanes 26. This insures that at any instant in time with respect to the relative movement of the rotor and the guide vane, at least two and normally three rotor blades are in the flow path between guide vanes. A plane through the longitudinal axis of the primary housing radially disposed and perpendicular to the peripheral surface of the rotor housing 28 and to the secondary housing 14 shows that the rotor blades are disposed at approximately a forty-five degree angle to such a plane as is the static guide vanes on the opposite side of the plane, forming an approximate ninety degree angle between the static guide vanes 26 and the rotor blades 30. The blade and static guide angles could be adjusted slightly to compensate for the apparent relative motion between the moving rotor blades and the static guide blades to effect maximum reactive force on the rotor of the moving water shown by the arrows.

It should be emphasized that, to be commercially viable, energy converter 10 normally must be of enormous size. This is so because converter 10 will normally be exposed to relatively mild currents, having relatively small kinetic energies per unit of cross-sectional flow. Hence, to garner and generate appreciable power, the flow cross section and turbine rotor 30 of converter 10 must be huge, and the angular velocity of rotor 30 correspondingly small. The embodiment of FIG. 6 is particularly adapted to such conditions.

Figure 6:
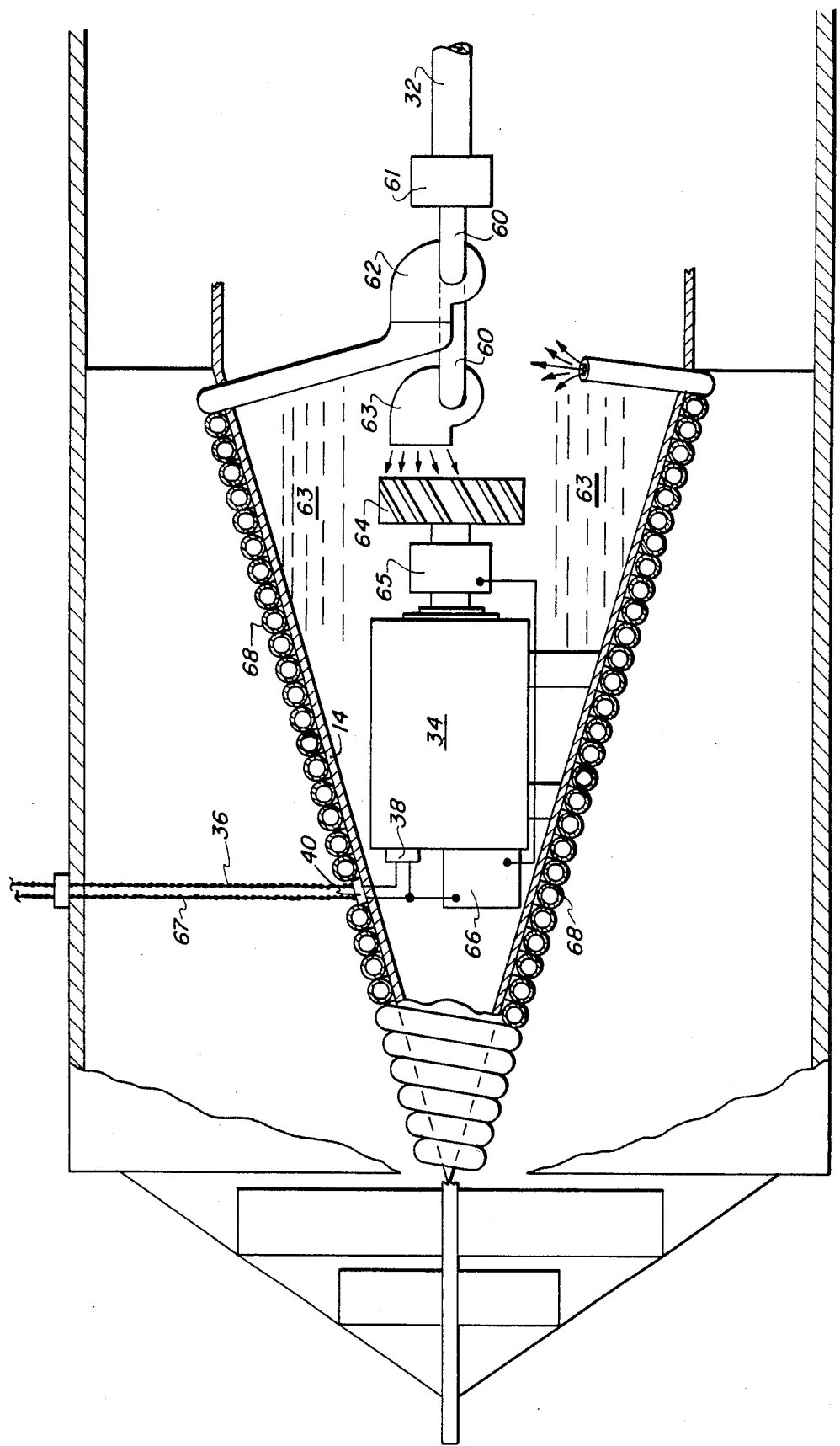
FIG. 6 is a view similar to that of FIG. 2, showing an alternative embodiment of the invention.

In FIGS. 6, turbine shaft 32 connects to pump shaft 60 via gear box 61. The purpose of the gearing in gear box 61 is to increase the slow angular velocity of shaft 32 to a magnitude more appropriate to the machinery inside housing 14. Gear box 61 can be a variable transmission to accomodate varying speeds of shaft 32 resulting from varying flow velocities through converter 10. Housing 14 is filled by fluid 63, which can be lubricating fluid. Shaft 60 drives pumps 62, 63, each of whose suction ends are open to fluid 63. Pump 63 moves fluid 63 against a further turbine rotor 64 which, via intermediate gear box 65, drives electrical generator 34. The variable gearing in box 65 operates to ensure that generator 34's rotor turns within a narrow range of optimal frequencies. Shifting of gears within box 65 can be controlled locally and automatically by electronic controller 66 located within housing 14, or remotely via control signal transmission line 67. Pump 62 circulates fluid 63 through heat exchange coil 68 wrapped about the exterior of housing 14 so that mechanical heat generated within housing 14 may be more easily rejected to sea/river water traversing the length of energy converter 10.

In operation, the motor as shown is deployed in an appropriate, natural environment having a current of water, such as in the Gulfstream. The device is anchored such that the upstream surface and opening of the primary housing 12 faces into and along the directional movement of the stream. The electrical outlet conduit 36 is then coupled to an appropriate station for distribution to the consumer. As water flows through the primary housing, it is accelerated over the conical shape of the secondary housing 14, strikes the static guide vanes 26 where it is deflected for reactive contact with rotor blades 30. The force on the rotor blades 30 causes the rotor housing 28, which is key locked into shaft 32, to rotate, thus rotating shaft 32. As shaft 32 rotates, the generator mechanism rotates, generating electricity. The expanded water, after striking rotor blade 30, then passes over tertiary housing 46 along the guide panels 38, 50, 52, through the circular guard panels 54 and 56. Thus, naturally occurring energy can be recovered in a most efficient way without disturbing the environment.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A power generating system for converting the kinetic energy of a stream of fluid flow into useable energy, said system comprising:

a venturi, said venturi comprising a first housing, said first housing being an elongate flow orifice comprising a flow constriction, said flow constriction being located within said first housing, said flow constriction dividing said first housing into a divergent flow entrance, a divergent flow exit and a throat, said flow constriction comprising a secondary sealed housing;

a turbine rotor located in said throat between said secondary housing and said divergent flow exit in the direction of fluid flow through said venturi, said turbine rotor being adapted to rotate responsive to said fluid flow;

shaft means adapted to transmit the rotational energy resulting from rotation of said turbine rotor;

a means for generating useable energy responsive to said rotational energy transmitted from said turbine rotor, said means for generating being located within said secondary housing, whereby to convert said kinetic energy of said fluid flow to said useable energy;

wherein said fluid flow is water flow in a body of water, and said system comprises a floatation means for maintaining said system at a selected depth in said body of water; and wherein said floatation means comprises one or more floatation tanks, said floatation tanks being at least partially liquid filled, and at least one compressed air tank, each said at least one air tank being effective to selectively inject compressed air into each said floatation tank to maintain said system at said selected depth.

2. A power generating system for converting the kinetic energy of a stream of fluid flow into useable energy, said system comprising:

a venturi, said venturi comprising a first housing, said first housing being an elongate flow orifice comprising a flow constriction, said flow constriction being located within said first housing, said flow constriction dividing said first housing into a divergent flow entrance, a divergent flow exit and a throat, said flow constriction comprising a secondary sealed housing;

a turbine rotor located in said throat between said secondary housing and said divergent flow exit in the direction of fluid flow through said venturi, said turbine rotor being adapted to rotate responsive to said fluid flow;

shaft means adapted to transmit the rotational energy resulting from rotation of said turbine rotor;

a means for generating useable energy responsive to said rotational energy transmitted from said turbine rotor, said means for generating being located within said secondary housing, whereby to convert said kinetic energy of said fluid flow to said useable energy; and wherein said system comprises a lubricating fluid located and sealed within said secondary housing, said lubricating fluid being effective to reject substantial amounts of heat from within said secondary housing to said fluid flow.

3. The system of claim 2, wherein said system comprises a heat rejection tube, a portion of said tube being disposed on the outer surface of said secondary housing in contact with said fluid flow, said system further comprising a cooling pump means disposed within said secondary housing for pumping said lubricating fluid through said tube.

4. A power generating system for converting the kinetic energy of a stream of fluid flow into useable energy, said system comprising:

a venturi, said venturi comprising a first housing, said first housing being an elongate flow orifice comprising a flow constriction, said flow constriction being located within said first housing, said flow constriction dividing said first housing into a divergent flow entrance, a divergent flow exit and a throat, said flow constriction comprising a secondary sealed housing;

a turbine rotor located in said throat between said secondary housing and said divergent flow exit in the direction of fluid flow through said venturi, said turbine rotor being adapted to rotate responsive to said fluid flow;

shaft means adapted to transmit the rotational energy resulting from rotation of said turbine rotor;

means for generating useable energy responsive to said rotational energy transmitted from said turbine rotor, said means for generating being located within said secondary housing, whereby to convert said kinetic energy of said fluid flow to said useable energy; and wherein said means for generating useable power comprises a further turbine rotor, a pump means, a transmission means, and an electric generator, said pump means being effective to pump a fluid located within said secondary housing against said further turbine rotor, causing said further turbine rotor to rotate, said transmission means being effective to cause said electric generator to generate electric power responsive to the rotation of said further turbine rotor.

5. The system of claim 4, wherein said transmission means comprises a generator gearing means effective to generate said electric power by causing said electric generator to turn, responsive to said rotation of said further turbine rotor, at a frequency within a preselected range of frequencies.

6. The system of claim 5, wherein said generator gearing means is a variable transmission having a plurality of gear ratios, and said generator gearing means comprises a control means effective to change the gear ratio from among said plurality of gear ratios responsive to said frequency of said second shaft means so as to maintain the turning frequency of said electric generator within said preselected range of frequencies.

7. The system of claim 6, wherein said fluid flow is water flow in a body of water, and said system comprises a floatation means for maintaining said system at a selected depth in said body of water, said floatation means comprising one or more floatation tanks, said floatation tanks being at least partially liquid filled, said floatation means further comprising at least one compressed air tank, each said at least one air tank being effective to selectively inject compressed air into each said floatation tank to maintain said system at said selected depth.

8. The system of claim 6, wherein said fluid within said secondary housing is a lubricating fluid sealed within said secondary housing, said lubricating fluid being effective to reject substantial amounts of heat from within said secondary housing to said fluid flow, said system further comprising a heat rejection tube, a portion of said tube being disposed on the outer surface of said secondary housing in contact with said fluid flow, said system further comprising a cooling pump means disposed within said secondary housing for pumping said lubricating fluid through said tube, whereby to cool the interior of said secondary housing.

9. The system of claim 8, wherein said fluid flow is water flow in a body of water, and said system comprises a floatation means for maintaining said system at a selected depth in said body of water, said floatation means comprises one or more floatation tanks, said floatation tanks being at least partially liquid filled, at least one compressed air tank, each said at least one air tank being effective to selectively inject compressed air into each said floatation tank to maintain said system at said selected depth.

* * * * *